United States Patent
Gollnick et al.

(10) Patent No.: US 12,292,170 B2
(45) Date of Patent: May 6, 2025

(54) ILLUMINATION DEVICE FOR VEHICLES

(71) Applicant: HELLA GmbH & Co. KGaA, Lippstadt (DE)

(72) Inventors: Ansgar Gollnick, Paderborn (DE); Giuseppe Mattina, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/661,184

(22) Filed: May 10, 2024

(65) Prior Publication Data

US 2024/0295299 A1 Sep. 5, 2024

Related U.S. Application Data

(63) Continuation of application No. PCT/EP2022/080957, filed on Nov. 7, 2022.

(30) Foreign Application Priority Data

Nov. 10, 2021 (DE) ...................... 10 2021 129 266.2

(51) Int. Cl.
*F21S 41/24* (2018.01)
*F21S 41/20* (2018.01)

(52) U.S. Cl.
CPC ........... *F21S 41/24* (2018.01); *F21S 41/2805* (2024.05)

(58) Field of Classification Search
CPC .... F21S 41/24; F21S 41/2805; F21S 43/2651; F21S 43/246; F21S 43/2492; F21S 43/252; F21S 43/253; F21S 43/281; F21S 43/2811; F21S 43/28131; F21S 43/28133; F21S 43/28135; F21S 43/2815; F21S 43/2817;
(Continued)

(56) References Cited

U.S. PATENT DOCUMENTS

| | | | | |
|---|---|---|---|---|
| 4,912,606 | A * | 3/1990 | Yamamoto | B60Q 1/28 362/521 |
| 5,081,564 | A * | 1/1992 | Mizoguchi | F21S 43/26 362/268 |
| 10,627,066 | B2 | 4/2020 | Takenaga et al. | |

(Continued)

FOREIGN PATENT DOCUMENTS

| DE | 102007036793 A1 | 2/2009 |
|---|---|---|
| DE | 102017100754 A1 | 7/2018 |

(Continued)

OTHER PUBLICATIONS

Search English translation of WO-2004052682-A1 (Year: 2004).*
International Search Report dated Jan. 30, 2023 in corresponding application PCT/EP2022/080957.

*Primary Examiner* — Omar Rojas Cadima
(74) *Attorney, Agent, or Firm* — Muncy, Geissler, Olds & Lowe, P.C.

(57) ABSTRACT

An illumination device for vehicles, having a housing, a cover lens, which closes an opening in the housing, an elongate light guide, a light source for coupling light into the elongate light guide, a groove-like receptacle for receiving the elongate light guide, an outcoupler for coupling out the light coupled into the elongate light guide. The outcoupler is arranged along part of a lateral surface of the elongate light guide. The groove-like receptacle runs along an edge of the cover lens so that a position light is produced.

10 Claims, 2 Drawing Sheets

(58) Field of Classification Search
CPC .... F21S 43/237; F21S 43/245; B60Q 1/0052;
F21W 2103/00
See application file for complete search history.

(56) References Cited

U.S. PATENT DOCUMENTS

| | | | |
|---|---|---|---|
| 10,718,481 B2 | 7/2020 | Nakaya | |
| 2010/0238015 A1* | 9/2010 | Fukasawa | B60R 1/1207 |
| | | | 362/494 |
| 2012/0051077 A1* | 3/2012 | Arai | F21S 41/24 |
| | | | 362/516 |
| 2013/0265790 A1 | 10/2013 | Saito | |
| 2014/0293630 A1 | 10/2014 | Domini et al. | |

FOREIGN PATENT DOCUMENTS

| | | | | |
|---|---|---|---|---|
| DE | 102019007425 A1 | 8/2020 | | |
| DE | 102019118518 A1 | 1/2021 | | |
| DE | 102020102602 A1 | 8/2021 | | |
| EP | 3608171 A1 | 2/2020 | | |
| JP | 2016035855 A | 3/2016 | | |
| JP | 2020004599 A | 1/2020 | | |
| WO | WO-2004052682 A1 * | 6/2004 | ............... | B60Q 1/00 |

* cited by examiner

ILLUMINATION DEVICE FOR VEHICLES

This nonprovisional application is a continuation of International Application No. PCT/EP2022/080957, which was filed on Nov. 7, 2022, and which claims priority to German Patent Application No. 10 2021 129 266.2, which was filed in Germany on Nov. 10, 2021, and which are both herein incorporated by reference.

BACKGROUND OF THE INVENTION

Field of the Invention

The invention relates to an illumination device for vehicles, comprising a housing and a cover lens, which closes an opening in the housing, with an elongate light guide, with a light source for coupling light into the elongate light guide, with a groove-like receptacle for receiving the elongate light guide, with an outcoupler for coupling out the light coupled into the elongate light guide, wherein the outcoupler is arranged along part of a lateral surface of the elongate light guide.

Description of the Background Art

From DE 10 2019 118 518 A1, which is incorporated herein by reference, an illumination device for vehicles is known, in which an elongate light guide is arranged at a distance from a lens covering a housing of the illumination device. The light guide is designed to be flexible so that it can be arranged variably within the housing in order to ensure a strip-like light emission for a signal light function, for example, a daytime running light function.

From DE 10 2020 102 602 A1, which is incorporated herein by reference, an illumination device for vehicles is known, which comprises an elongate light guide that is fastened in a groove-like receptacle. The groove-like receptacle runs in an edge region of a cover lens, which closes an opening of a housing of the illumination device. The light guide extends over more than half the width of the vehicle front or rear and can serve as a position light.

SUMMARY OF THE INVENTION

It is therefore an object of the present invention to develop an illumination device for vehicles in such a way that contour illumination of the illumination device is ensured in a simple manner.

To achieve this object, the invention in an example is characterized in that the groove-like receptacle runs along an edge of the lens to produce a position light.

An advantage of the invention is that by arranging a groove-like receptacle for a light guide on a circumferential edge of the cover lens, a position light can be easily produced, which allows the viewer to see the contour of the cover lens. If the groove-like receptacle is made in one piece and closed, it can be easily attached after the light guide is inserted into the groove-like receptacle. The closed shape of the groove-like receptacle predetermines a closed shape of the elongate light guide. The latter has no beginning and no end and is therefore viewed as the border of the illumination device. The groove-like receptacle can run on a plane or in a three-dimensional space.

The groove-like receptacle can be attached to the cover lens and/or to a housing of the illumination device and/or to a frame carrying a light module within the housing. Depending on the shape of the illumination device or the cover lens, this allows for variable fastening without the attachment being visible from the outside.

A diffusing optics element can be arranged in the main emission direction of the illumination device, upstream of the elongate light guide on an inside or an outside of the cover lens. The diffusing optics element is only located in an edge section of the cover lens, which is covered on the inside by the groove-like receptacle. The cover lens must therefore be designed to be enlarged by the edge section so that a designated main section of the cover lens can be detected by beams from the light module.

The edge section of the cover lens can be formed of a material that absorbs laser light, so that the diffusing optics elements can be generated by lasers within the cover lens. In this way, the cover lens presents to the observer as a homogeneous progression.

The elongate light guide can be formed of a rigid plastic material, so that the elongate light guide is dimensionally stable.

The elongate light guide can be arranged in the groove-like receptacle in a non-positive and/or positive manner. The elongate light guide with the groove-like receptacle advantageously forms a structural unit which can then be attached to the housing or to the cover lens or to a supporting frame.

The groove-like receptacle can be U-shaped in cross section, wherein an outer first leg of the groove-like receptacle is covered by an edge trim of the cover lens. This edge trim is not translucent and therefore forms a margin for the translucent other part of the cover lens.

A light source can be arranged in a corner region of the cover lens for coupling the light into the elongate light guide. This advantageously means that the light source is not visible to an observer from the outside.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
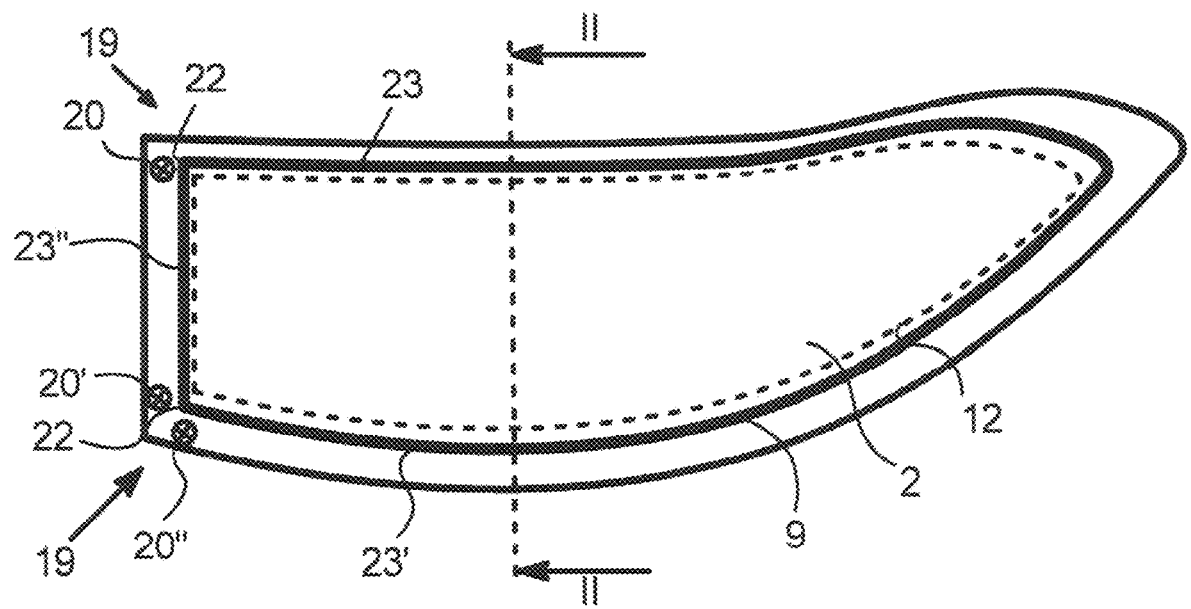
FIG. 1 shows a front view of an illumination device.
Figure 2:
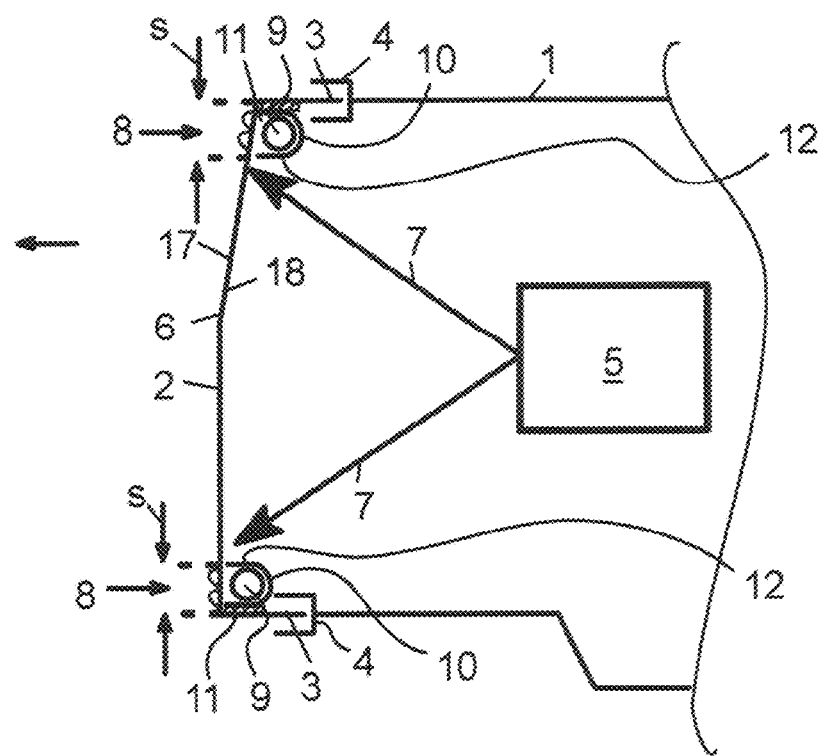
FIG. 2 shows a vertical cross section through the illumination device along line II-II in FIG. 1.

An illumination device for vehicles is used to provide a position light.

The illumination device has a housing 1 with an opening which is covered by a substantially light-transmitting cover lens 2. A web 3 of the cover lens 2 can, for example, be inserted in a groove 4 on the edge of the housing 1 and be connected non-positively and/or positively. For example, the web 3 can be arranged in an adhesive bed of the groove 4, so that the cover lens 2 is materially connected to the housing 1.

A light module 5 is arranged within the housing 1 to generate a low beam distribution and/or high beam distribution or other light distributions.

The cover lens 2 has a central main section 6, which is assigned to the light module 5. This means that the main section 6 of the cover lens 2 can be completely captured by light beams 7 of the light module 5.

Furthermore, the cover lens 2 has an edge section 8 surrounding the main section 6, which cannot be captured by light beams 7 of the light module 5. In the main emission direction H downstream of the edge section 8 there is an elongate light guide 9 and a groove-like receptacle 10 of a position light device that accommodates the said light guide.

The groove-like receptacle 10 can be U-shaped and completely accommodate the elongate light guide 9.

The groove-like receptacle 10 is formed in one piece and is closed and has an outer leg 11 and an inner leg 12. The outer leg 11 is materially connected to the cover lens 2, for example by adhesion or lasering.

The groove-like receptacle 10 can also be connected to the housing 1 in a non-positive and/or positive manner.

The groove-like receptacle 10 can also be attached to the cover lens 2 and/or to the housing 1 and/or to a supporting frame, which carries the light module 5 or part of the light module 5, for example a lens. In the main emission direction H, the groove-like receptacle 10 covers the edge section 8 of the cover lens 2. The edge section 8 of the cover lens 2 serves exclusively for the passage of the light 13 emitted by the elongate light guide 9. The edge section 8 of the cover lens 2 forms an edge trim with a width s, which is a width of the elongate receptacle 10 or an outer distance corresponding to the distance between the inner leg 12 and the outer leg 11 of the groove.

The elongate light guide 9 can have an outcoupler 15 on a side facing a vertex 14 of the receptacle 10 for coupling out the light coupled into the elongate light guide 9. The outcoupler 15 can, for example, be designed as prism elements. The outcoupler 15 thus run along part of a lateral surface of the elongate light guide 9.

The groove-like receptacle 10 and the elongate light guide 9 run along an edge of the cover lens 2.

So that the light 13 emitted from the elongate light guide 9 is scattered into the environment, a number of diffusing optics elements 16 are arranged on an outside 17 of the edge section 8 of the cover lens 2. The diffusing optics elements 16 can be designed, for example, as cushion optic elements.

The number of diffusing optics elements 16 can also be arranged on an inside 18 of the edge section 8 of the cover lens 2.

The edge section 8 can be formed of a light-absorbing material, so that the number of diffusing optics elements 16 can be generated by lasering within the cover lens 2, so that the cover lens 2 has a more homogeneous exterior appearance.

Due to the circumferential arrangement of the cover lens 2 or the light guide 9 on the edge of the cover lens 2, the illumination device receives a closed position light, which serves as contour illumination for the illumination device.

The elongate light guide 9 is formed of a rigid plastic material so that it is held in the elongate receptacle 10 in a dimensionally stable manner. The cover lens 2 is manufactured by injection molding and can be formed of a one-component or two-component plastic material or a three-component plastic material.

In a corner region 19 of the cover lens 2, a light source 20 is arranged, which is assigned to an end 22 of a subsection 23 of the elongate light guide 9. If necessary, the subsection 23 of the light guide 9 can have an elongating extension, so that the light source 20 can be arranged further away from the circumferential light guide 9.

Preferably, one end of the subsection 23 is designed to be rectilinear, so that a high light yield is achieved when the light is coupled into the elongate light guide 9.

The elongate light guide 9 can be composed of three subsections 23, 23', 23", each of which is assigned a light source 20, 20', 20". The subsections 23, 23', 23" are of different lengths. The light sources 20, 20', 20" are controlled in such a way that a homogeneous light emission (with homogeneous illuminance) can be emitted over the entire length of the light guide 9.

Since the subsection 23" is significantly shorter than the other subsections 23, 23', the luminous flux emitted by the light source 20" assigned to the subsection 23" is smaller than the luminous flux of the other light sources 20, 20'.

Figure 3:
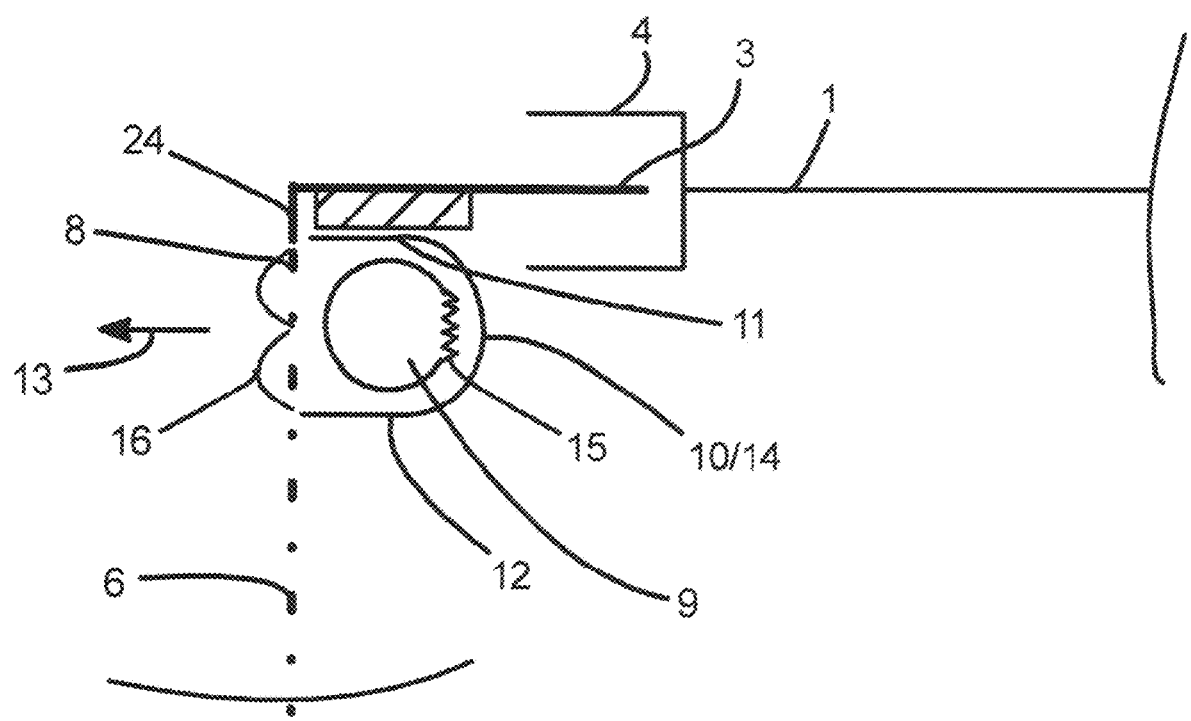
FIG. 3 shows an enlarged representation of an upper edge of the cover lens in FIG. 2.

Preferably, in an outer edge region of the edge section 8, the cover lens 2 has an edge trim 24 that is not translucent (solid line in FIG. 3). The edge trim 24 covers the outer leg 11 of the receptacle 10, so that it is not visible from the outside when the illumination device is switched off. The further part of the edge section 8 and the main section 6 of the cover lens 2 formed of a preferably crystal-clear plastic material (dashed line in FIG. 3).

The light guide 9 can also be designed as a flexible glass fiber light guide into which laser light is coupled, which is generated by a laser light source.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An illumination device for a vehicle, the illumination device comprising:
   a housing;
   a cover lens that closes an opening formed in the housing;
   an elongate light guide;
   a light source to couple in light into the elongate light guide;
   a receptacle to receive the elongate light guide; and
   an outcoupler to couple out the light coupled into the elongate light guide, the outcoupler being arranged along part of a lateral surface of the elongate light guide,
   wherein the receptacle runs along an edge section of the cover lens so that a position light is produced, and
   wherein at least two diffusing optics elements are arranged on an inside and/or an outside of only the edge section of the cover lens, such that, in a main emission direction of the illumination device, the at least two diffusing optics elements are arranged downstream of the elongate light guide.

2. The illumination device according to claim 1, wherein the receptacle is closed and/or formed in one piece.

3. The illumination device according to claim 1, wherein the receptacle is attached to the cover lens and/or to the housing and/or to at least part of a frame carrying a light module within the housing.

4. The illumination device according to claim 1, wherein the edge section of the cover lens is formed of a material that absorbs laser light, such that the at least two diffusing optics elements are formed and arranged in the cover lens by lasering.

5. The illumination device according to claim 1, wherein the receptacle and the elongate light guide are arranged circumferentially to the cover lens and, in the main emission direction of the illumination device, the receptacle and the elongate light guide are arranged upstream of the edge section of the cover lens, wherein the edge section surrounds a main section of the cover lens, and wherein the main section of the cover lens serves as a passage surface for a light emitted by a light module within the housing.

6. The illumination device according to claim 1, wherein the elongate light guide is formed of a rigid plastic material.

7. The illumination device according to claim 1, wherein the elongate light guide is non-positively and/or positively connected to the receptacle.

8. The illumination device according to claim 1, wherein the receptacle has a U-shaped cross-section, and wherein an outer leg of the receptacle is covered by an edge trim of the cover lens.

9. The illumination device according to claim 1, wherein the cover lens is produced by injection molding.

10. The illumination device according to claim 1, wherein the light source is arranged in a corner region of the cover lens for coupling the light into the elongate light guide.

* * * * *